US011640102B2

(12) United States Patent
Tsai et al.

(10) Patent No.: US 11,640,102 B2
(45) Date of Patent: May 2, 2023

(54) CAMERA MODULE AND ELECTRONIC DEVICE

(71) Applicant: LARGAN PRECISION CO., LTD., Taichung (TW)

(72) Inventors: Chun-Hua Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 57 days.

(21) Appl. No.: 17/409,991

(22) Filed: Aug. 24, 2021

(65) Prior Publication Data

US 2021/0382376 A1 Dec. 9, 2021

Related U.S. Application Data

(63) Continuation of application No. 16/795,680, filed on Feb. 20, 2020, now Pat. No. 11,131,905.

(60) Provisional application No. 62/811,062, filed on Feb. 27, 2019.

(51) Int. Cl.
*G03B 17/12* (2021.01)
*G02B 7/02* (2021.01)

(52) U.S. Cl.
CPC ............. *G03B 17/12* (2013.01); *G02B 7/021* (2013.01)

(58) Field of Classification Search
CPC ........ G03B 17/12; G03B 30/00; G02B 7/021; G02B 5/003; G02B 13/0045; G02B 13/0015; H04N 5/2254
See application file for complete search history.

(56) References Cited

U.S. PATENT DOCUMENTS

| 9,678,336 | B2 | 6/2017 | Cho et al. |
| 9,746,634 | B2 | 8/2017 | Wei et al. |
| 9,746,635 | B2 | 8/2017 | Wei et al. |
| 9,759,886 | B2 | 9/2017 | Wei et al. |
| 10,114,192 | B2 | 10/2018 | Wei et al. |
| 2011/0069198 | A1* | 3/2011 | Ezawa .................. G02B 7/025 348/222.1 |

(Continued)

FOREIGN PATENT DOCUMENTS

| CN | 202057870 U | 11/2011 |
| CN | 205210390 U | 5/2016 |

(Continued)

*Primary Examiner* — James C. Jones
(74) *Attorney, Agent, or Firm* — McClure, Qualey & Rodack, LLP

(57) ABSTRACT

A camera module includes an imaging lens assembly and an image sensor, wherein the image sensor is located on an image side of the imaging lens assembly. The imaging lens assembly has an optical axis and includes a plastic lens barrel and a plurality of plastic lens elements, wherein the plastic lens elements are disposed in the plastic lens barrel. The plastic lens barrel includes an object-side outer surface, a lens barrel minimum opening, an object-side outer inclined surface and a reversing inclined surface. The object-side outer surface is a surface of the plastic lens barrel facing towards an object side being closest to the object side and is annular. The reversing inclined surface expands from the lens barrel minimum opening to the image side, wherein a connecting position of the reversing inclined surface and the object-side outer inclined surface forms the lens barrel minimum opening.

9 Claims, 17 Drawing Sheets

(56) References Cited

U.S. PATENT DOCUMENTS

| | | |
|---|---|---|
| 2017/0139172 A1 | 5/2017 | Wei et al. |
| 2017/0139173 A1 | 5/2017 | Wei et al. |
| 2017/0139174 A1 | 5/2017 | Wei et al. |
| 2017/0139175 A1 | 5/2017 | Wei et al. |
| 2017/0139176 A1 | 5/2017 | Wei et al. |
| 2017/0139177 A1 | 5/2017 | Wei et al. |
| 2018/0299637 A1 | 10/2018 | Wan |

FOREIGN PATENT DOCUMENTS

| | | |
|---|---|---|
| CN | 205210492 U | 5/2016 |
| CN | 205507179 U | 8/2016 |
| CN | 206331166 U | 7/2017 |
| CN | 206671650 U | 11/2017 |

\* cited by examiner

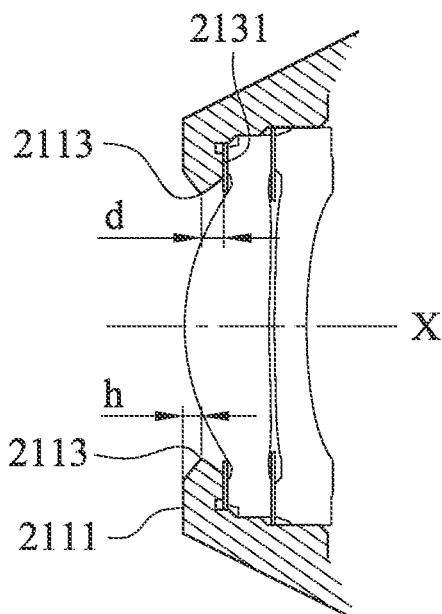
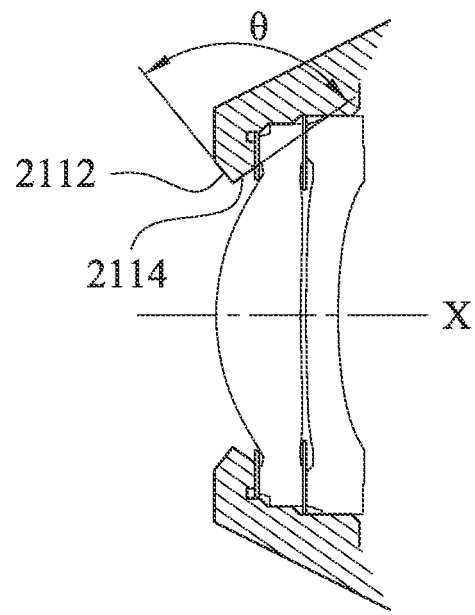
Fig. 2D
Fig. 2E
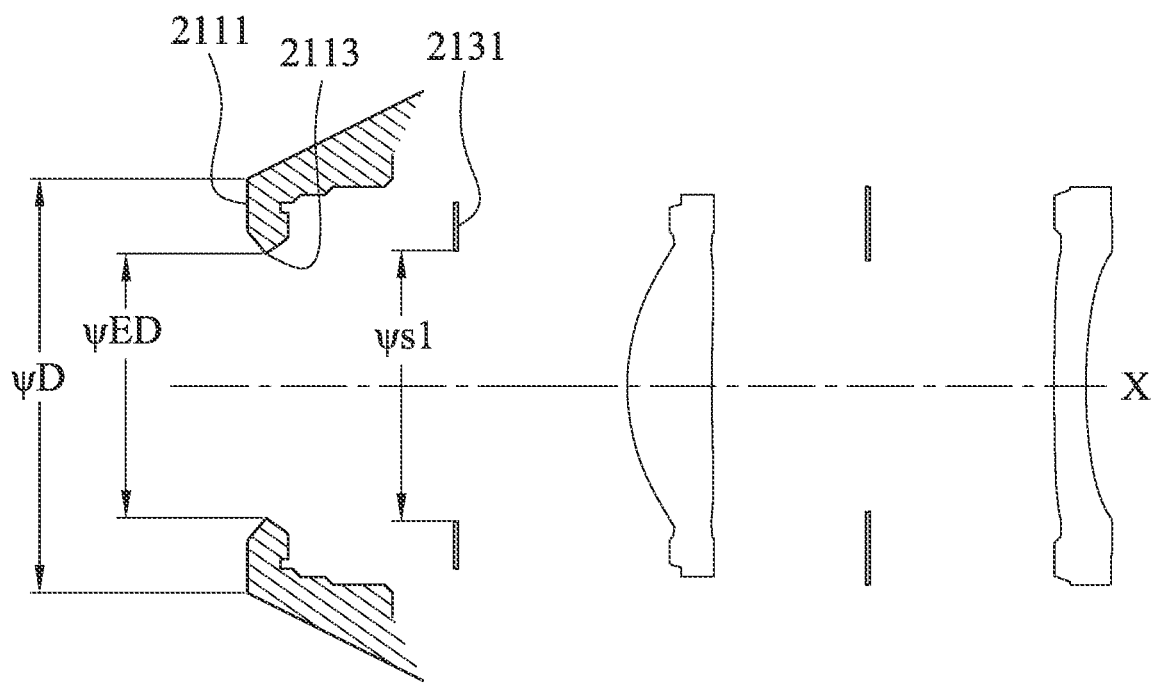
Fig. 2F

CAMERA MODULE AND ELECTRONIC DEVICE

RELATED APPLICATIONS

The present application is a continuation of U.S. application Ser. No. 16/795,680, filed Feb. 20, 2020, which claims priority to Provisional Application Ser. No. 62/811,062, filed Feb. 27, 2019, which is herein incorporated by reference.

BACKGROUND

Technical Field

The present disclosure relates to a camera module. More particularly, the present disclosure relates to a camera module applicable to portable electronic devices.

Description of Related Art

A common camera module generally has a protective glass disposed between an imaging lens assembly and an object. Since between the protective glass and the imaging lens assembly has an air distance, when the strong light of the object causes a stray light, the influence of the stray light can be mitigated by the means for reducing reflection disposed in the imaging lens assembly.

However, when the camera module is disposed in a common electronic device with camera functions, a display screen made of light-transmitting material is disposed between the imaging lens assembly and the object, and the display screen has a backlight board whose luminous location is closer to the imaging lens assembly than the strong light of the object thereto. Therefore, the influence of the stray light cannot be mitigated by the means for reducing reflection disposed in the imaging lens assembly, and the quality of the image is also easier to affect.

Therefore, developing a camera module which can effectively eliminate the stray light, has good imaging quality, and is miniaturized in the electronic device has become an important and urgent problem to be solved in the industry.

SUMMARY

According to one aspect of the present disclosure, a camera module includes an imaging lens assembly and an image sensor, wherein the image sensor is located on an image side of the imaging lens assembly. The imaging lens assembly has an optical axis and includes a plastic lens barrel and a plurality of plastic lens elements, wherein the plurality of plastic lens elements are disposed in the plastic lens barrel. The plastic lens barrel includes an object-side outer surface, a lens barrel minimum opening, an object-side outer inclined surface and a reversing inclined surface. The object-side outer surface is a surface of the plastic lens barrel facing towards an object side being closest to the object side and is annular. The object-side outer inclined surface is shrunk from the object-side outer surface toward the lens barrel minimum opening. The reversing inclined surface expands from the lens barrel minimum opening to the image side, wherein a connecting position of the reversing inclined surface and the object-side outer inclined surface forms the lens barrel minimum opening. When a number of the plurality of plastic lens elements is N, a maximum outer diameter of the object-side outer surface is $\psi D$, a distance between the lens barrel minimum opening and the object-side outer surface in a direction parallel to the optical axis is h, a chief ray angle between a chief ray corresponding to 1.0F image height of the imaging lens assembly and the image sensor is CRA 1.0F, and the following conditions can be satisfied: $4 \leq N \leq 10$, $0.8$ mm$<\psi D \leq 3.4$ mm, $0.01$ mm$<h<0.15$ mm and CRA 1.0F$>25.0$ degrees.

According to another aspect of the present disclosure, an electronic device includes the camera module according to the aforementioned aspect and a surface plate. The surface plate is disposed on the object side of the camera module. When a distance between a distance between the object-side outer surface and the surface plate in the direction parallel to the optical axis is g, the following condition can be satisfied: $0.03$ mm$<g<0.3$ mm.

According to another aspect of the present disclosure, a camera module includes an imaging lens assembly and an image sensor. The image sensor is located at an image side of the imaging lens assembly. The imaging lens assembly has an optical axis and includes a plastic lens barrel, a plurality of plastic lens elements and a light blocking sheet. The plurality of plastic lens elements are disposed in the plastic lens barrel. The plastic lens barrel includes an object-side outer surface, a lens barrel minimum opening and a reversing inclined surface. The object-side outer surface is a surface of the plastic lens barrel facing towards an object side being closest to the object side and is annular. The lens barrel minimum opening is surrounded by the object-side outer surface. The reversing inclined surface is expanded from the lens barrel minimum opening to the image side. The light blocking sheet is disposed in the plastic lens barrel and is located between the lens barrel minimum opening and an object-side peripheral portion of one of the plurality of plastic lens elements being closest to the object side. When a number of the plurality of plastic lens elements is N, a maximum outer diameter of the object-side outer surface is $\psi D$, a chief ray angle between a chief ray corresponding to 1.0F image height of the imaging lens assembly and the image sensor is CRA 1.0F, the following conditions can be satisfied: $4 \leq N \leq 10$, $0.8$ mm$<\psi D \leq 3.4$ mm and CRA 1.0F$>25.0$ degrees.

According to another aspect of the present disclosure, an electronic device includes the camera module according to the aforementioned aspect and a surface plate. The surface plate is disposed on the object side of the camera module. The surface plate is a plate having a display function module.

According to another aspect of the present disclosure, an electronic device includes a camera module and a surface plate. The surface plate is a plate having a display function module. The camera module includes an imaging lens assembly and an image sensor wherein the image sensor is located at an image side of the imaging lens assembly, the surface plate is located at an object side of the imaging lens assembly. The imaging lens assembly has an optical axis and includes a plastic lens barrel and a plurality of plastic lens elements, wherein the plurality of plastic lens elements are disposed in the plastic lens barrel. The plastic lens barrel includes an object-side outer surface, a lens barrel minimum opening and a reversing inclined surface. The object-side outer surface is a surface of the plastic lens barrel facing towards an object side and closest to the object side and is annular. The lens barrel minimum opening is surrounded by the object-side outer surface. The reversing inclined surface is expanded from the lens barrel minimum opening to the image side. When a number of the plurality of plastic lens elements is N, a maximum outer diameter of the object-side outer surface is $\psi D$, a chief ray angle between a chief ray corresponding to 1.0F image height of the imaging lens assembly and the image sensor is CRA 1.0F, the following conditions can be satisfied: 4≤N≤10, 0.8 mm<ψD≤3.4 mm and CRA 1.0F>25.0 degrees.

BRIEF DESCRIPTION OF THE DRAWINGS

The present disclosure can be more fully understood by reading the following detailed description of the embodiment, with reference made to the accompanying drawings as follows:

FIG. 10 is a schematic view of the surface plate and the camera module according to the 1st embodiment of FIG. 1A.

FIG. 2D is a schematic view of parameters h and d according to the 2nd embodiment of FIG. 2A.

FIG. 2E is a schematic view of a parameter θ according to the 2nd embodiment of FIG. 2A.

FIG. 2F is a schematic view of parameters ψD, ψED and ψs1 according to the 2nd embodiment of FIG. 2A.

DETAILED DESCRIPTION

Figure 1A:
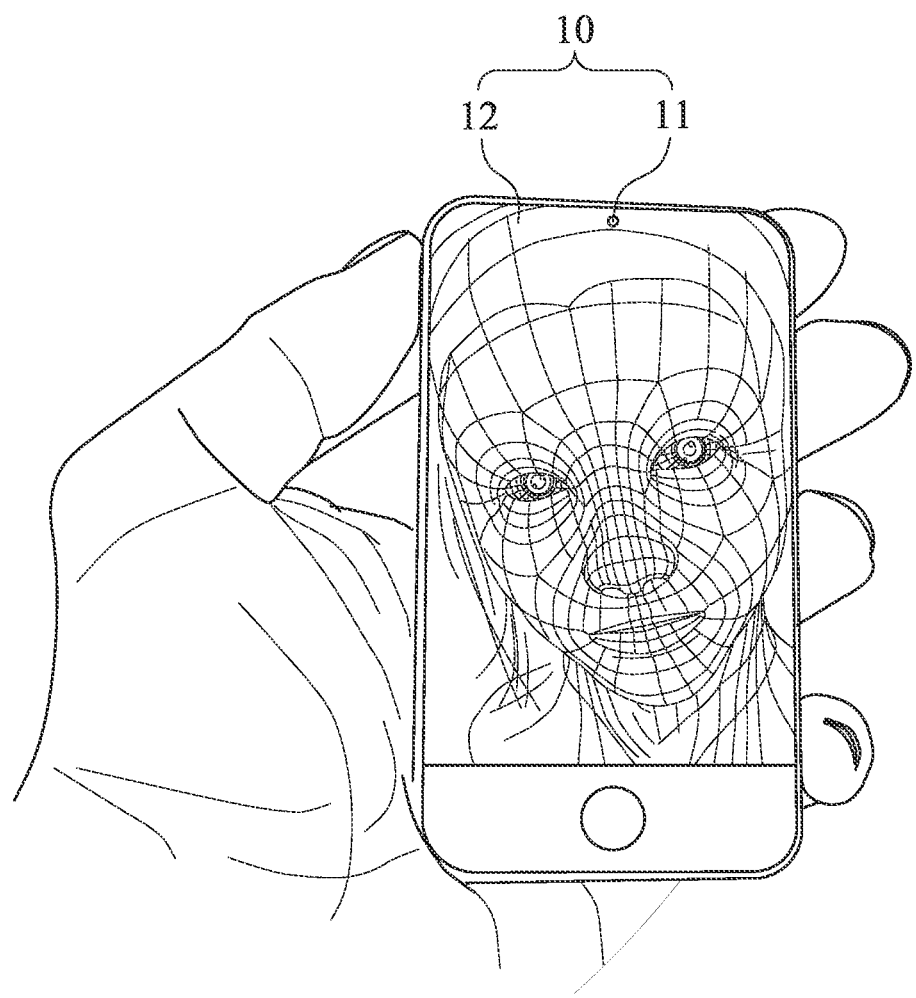
FIG. 1A is a schematic view of an electronic device according to the 1st embodiment of the present disclosure.

The present disclosure provides a camera module including an imaging lens assembly and an image sensor. The image sensor is located on an image side of the imaging lens assembly. The imaging lens assembly has an optical axis and includes a plastic lens barrel and a plurality of plastic lens elements. The plurality of plastic lens elements are disposed in the plastic lens barrel. The plastic lens barrel includes an object-side outer surface, a lens barrel minimum opening, an object-side outer inclined surface and a reversing inclined surface. The object-side outer surface is a surface of the plastic lens barrel facing towards an object side and being closest to the object side and is annular. The object-side outer inclined surface is shrunk from the object-side outer surface toward the lens barrel minimum opening. The reversing inclined surface is expanded from the lens barrel minimum opening to the image side. A connecting position of the reversing inclined surface and the object-side outer inclined surface forms the lens barrel minimum opening. When a number of the plurality of plastic lens elements is N, a maximum outer diameter of the object-side outer surface is ψD, a distance between the lens barrel minimum opening and the object-side outer surface in a direction parallel to the optical axis is h, a chief ray angle between a chief ray corresponding to 1.0F image height of the imaging lens assembly and the image sensor is CRA 1.0F, the following conditions can be satisfied: 4≤N≤10; 0.8 mm<ψD≤3.4 mm; 0.01 mm<h<0.15 mm; and CRA 1.0F>25.0 degrees. The configuration of the lens barrel minimum opening can be closer to the object-side outer surface by controlling the maximum outer diameter of the object-side outer surface ψD within a proper range, so as to reduce the unnecessary reflection between the object-side outer surface and the surface plate. On the other hand, a dimensional stability of injection molding and a manufacturing quality of the lens barrel minimum opening can be maintained by keeping h in a specific range. Further, because of the configuration of the object-side outer inclined surface and the reversing inclined surface, an unexpected light reflection can be reduced and can effectively eliminate the stray light which is easy to occur in camera modules with CRA greater than a certain angle. The larger CRA makes a path of the stray light close to the lens barrel minimum opening more uniform and an efficiency of the configuration of the reversing inclined surface and parameter h for eliminating the stray light can be increased.

Further, the larger CRA allows the imaging lens assembly to have an exit position and a principal point closer to the image sensor so as to effectively shorten the back focal length of the imaging lens assembly, and it is favorable for maintaining the developing ability of miniaturization under the trend of increasing the number of lens elements. In contrast, in the conventional art, the CRA of the endoscope is small and the number of lens elements is maintained in a small amount, the characteristics of the large CRA cannot be fully utilized. On the other hand, most of the imaging lens assemblies with the larger CRA are difficult to achieve miniaturization due to their large size and large imaging surface area, so it is difficult to apply on portable electronic devices.

The imaging lens assembly can further include a light blocking sheet disposed in the plastic lens barrel and located between the lens barrel minimum opening and an object-side peripheral portion of one of the plurality of plastic lens elements being closest to the object side. The design of the reversing inclined surface makes the lens barrel minimum opening closer to the object side than the reversing inclined surface is therefrom. Therefore, the non-imaging rays form larger incidence angles can be easier to enter the reversing inclined surface, and the path of the non-imaging rays can be easier controlled, so that it is suitable for a light blocking sheet to exert maximum shadowing efficiency.

When a distance between the lens barrel minimum opening and the light blocking sheet in the direction parallel to the optical axis is d, the following condition can be satisfied: 0.10 mm<d<0.4 mm. Therefore, the shadowing efficiency of the light blocking sheet cooperating with the reversing inclined surface can be enhanced and so as to cope with environments with higher stray light intensity. Further, the following condition can be satisfied: 0.12 mm<d<0.4 mm.

When a distance parallel to the optical axis between the lens barrel minimum opening and the light blocking sheet is d, and a distance parallel to the optical axis between the lens barrel minimum opening and the object-side outer surface is h, the following condition can be satisfied: 1.0<d/h<15.0. Therefore, the reversing inclined surface and the light blocking sheet can capture more stray light.

When a maximum outer diameter of the object-side outer surface is $\psi D$, the following condition can be satisfied: 1.0 mm<$\psi D$<2.8 mm. Therefore, the manufacturability of injection molding can be maintained, and when the lens barrel minimum opening is push out to the object-side outer surface, the molding quality of the plastic lens barrel can have good dimensional accuracy.

The reversing inclined surface can include a plurality of strip-shaped structures extended from the lens barrel minimum opening toward a direction perpendicular to the optical axis. In detail, the strip-shaped structures can be disposed on the surface of the reversing inclined surface, which can increase the efficiency of the reversing inclined surface eliminating the high intensity non-imaging rays and is suitable for miniaturization imaging lens assembly. Therefore, the reflection generated by the surface of the light blocking sheet receiving a large amount of the stray light can be eliminated.

When a diameter of the lens barrel minimum opening is $\psi ED$, and a diameter of an opening of the light blocking sheet is $\psi s1$, the following condition can be satisfied: 0.8≤$\psi ED$/$\psi s1$≤1.05. Therefore, the shading range of the light blocking sheet can be increased, and the quality of the resolving power and the performance of the optical specification will not be influenced. Further, the following condition can be satisfied: 0.8≤$\psi ED$/$\psi s1$≤1.0. Thus, the surface reflection generated by the opening of the light blocking sheet can be reduced.

The object-side outer inclined surface can be a first conical surface, the reversing inclined surface can be a second conical surface. When an angle between a sectional line passing through the optical axis of the first conical surface and a sectional line passing through the optical axis of the second conical surface is $\theta$, and the following condition can be satisfied: 45 degrees<$\theta$<120 degrees. Therefore, the probability of the surface reflection generated by the object-side outer inclined surface and the reversing inclined surface can be reduced, and the processing feasibility can be maintained. In detail, the processing feasibility may be surface fogging, cutting processing or other processing methods applied to the forming mold corresponding to the first conical surface and second conical surface, so that the above two parts after molding have better ability to eliminate stray lights.

Each of the aforementioned features of the camera module can be utilized in various combinations for achieving the corresponding effects.

The present disclosure provides an electronic device with camera functions. The electronic device includes the aforementioned camera module and a surface plate, wherein the surface plate is disposed on the object side of the camera module. When a distance between the object-side outer surface and the surface plate in the direction parallel to the optical axis is g, the following condition can be satisfied: 0.03 mm<g<0.3 mm. Therefore, it can avoid that the stray light enters the imaging lens assembly in an unexpected path so as to early shade the high-intensity light source via the technical characteristic h of the lens barrel minimum opening, and the stray lights after attenuated can be easily eliminated by other means of shielding stray light inside the imaging lens assembly. Further, the following condition can be satisfied: 0.03 mm<g<0.26 mm.

Further, the surface plate can be a plate having a display function module. In detail, the surface plate can be a display screen and includes a surface glass and a backlight board, and the present disclosure will not be limited thereto.

1st Embodiment

FIG. 1A is a schematic view of an electronic device 10 according to the 1st embodiment of the present disclosure. In FIG. 1A, the electronic device 10 is a full-screen mobile phone, but the present disclosure will not be limited thereto. The electronic device 10 includes a camera module 11 and a surface plate 12. The surface plate 12 is disposed on the object side of the camera module 11.

Figure 1B:
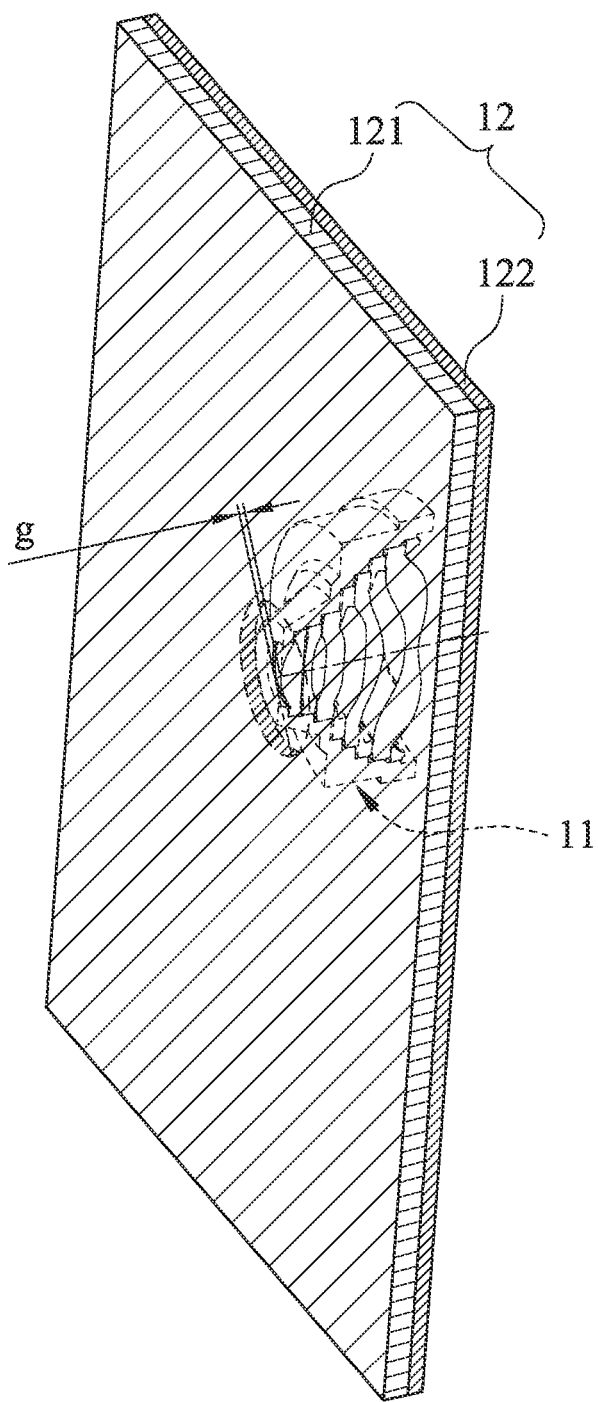
FIG. 1B is a schematic view of a surface plate according to the 1st embodiment of FIG. 1A.
Figure 1C:
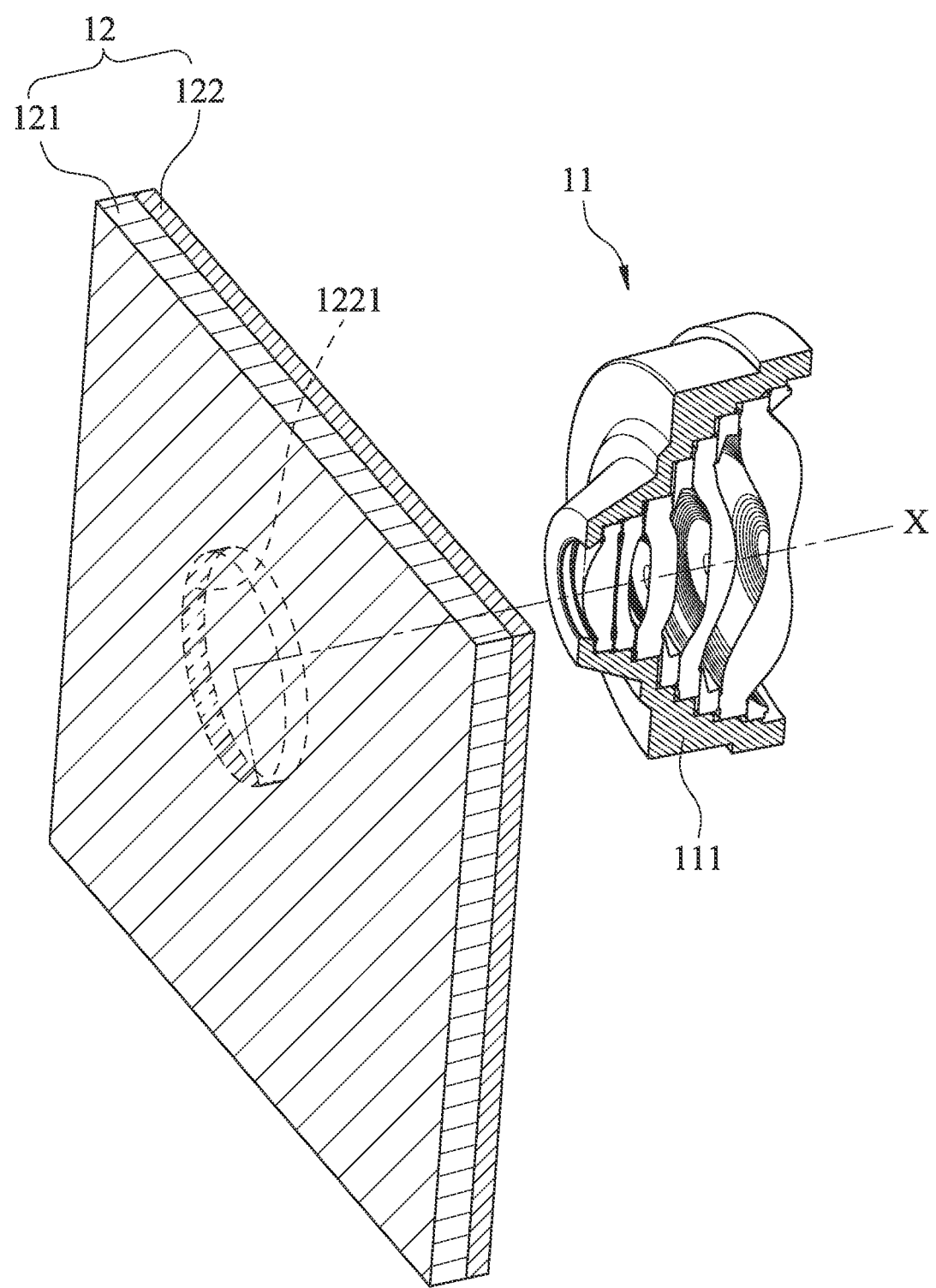
FIG. 1D is another schematic view of the surface plate and the camera module according to the 1st embodiment of FIG. 1A.
FIG. 1E is a schematic view of a plastic lens barrel according to the 1st embodiment of FIG. 1A.
FIG. 1F is a three-dimensional schematic view of the plastic lens barrel according to the 1st embodiment of FIG. 1A.
FIG. 1G is a schematic view of parameters h and d according to the 1st embodiment of FIG. 1A.
FIG. 1H is a schematic view of a parameter θ according to the 1st embodiment of FIG. 1A.
FIG. 1I is a schematic view of parameters ψD, ψED and ψs1 according to the 1st embodiment of FIG. 1A.
Figure 1D:
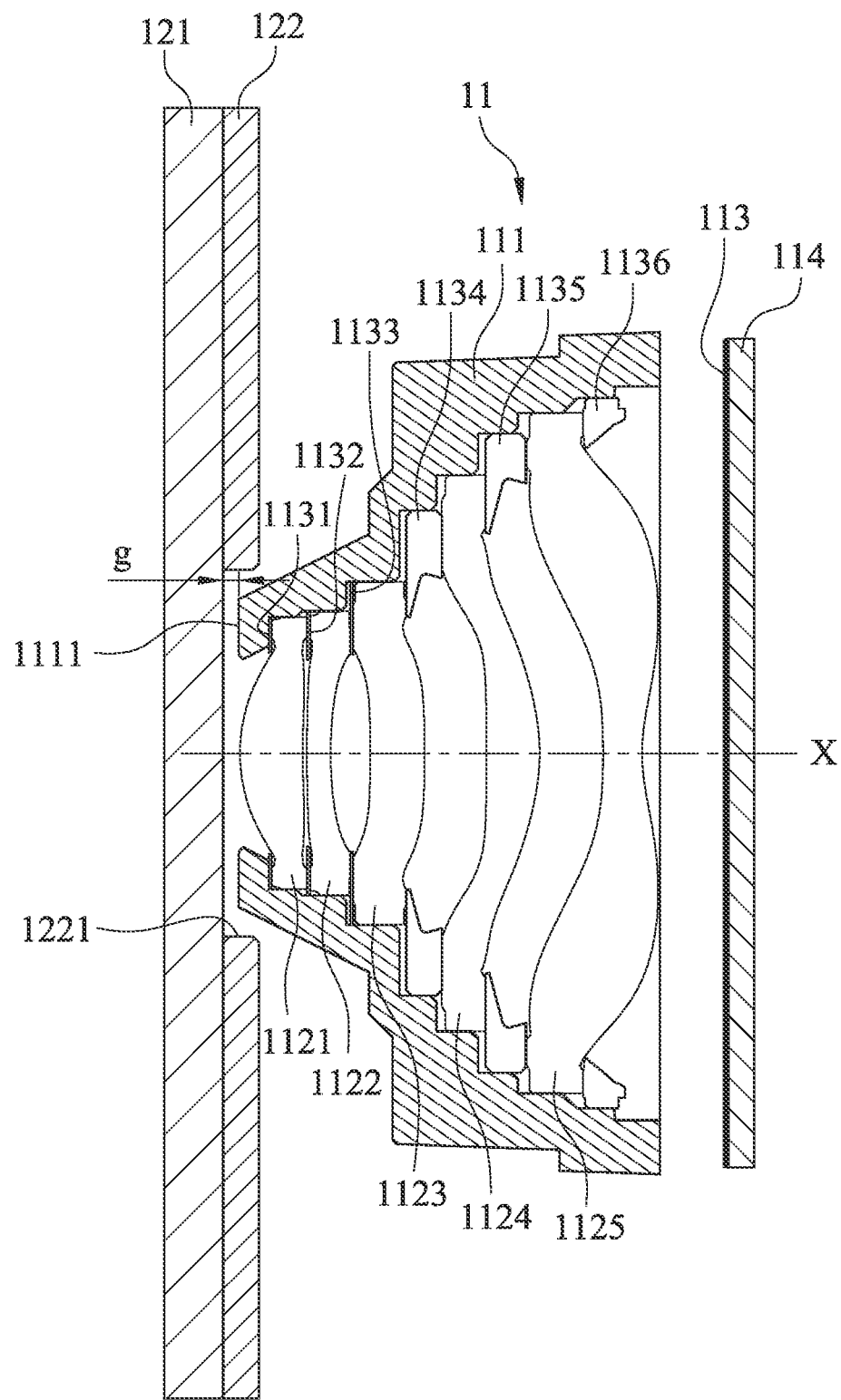

In detail, FIG. 1B is a schematic view of a surface plate 12 according to the 1st embodiment of FIG. 1A. FIG. 10 is a schematic view of the surface plate 12 and the camera module 11 according to the 1st embodiment of FIG. 1A. FIG. 1D is another schematic view of the surface plate 12 and the camera module 11 according to the 1st embodiment of FIG. 1A. In FIGS. 1B, 1C and 1D, the surface plate 12 can be a plate having a display function module and includes a surface glass 121 and a backlight board 122, wherein the backlight board 122 is connected to the image-side surface of the surface glass 121, the surface glass 121 can be a glass substrate, and the backlight board 122 can be an LED and used as a light source of array light, but the present disclosure will not be limited thereto. The camera module 11 includes an imaging lens assembly (its reference numeral is omitted) and an image sensor 114. The image sensor 114 is located at an image side of the imaging lens assembly (that is, on the imaging surface 113). The surface plate 12 is located at the object side of the imaging lens assembly.

The imaging lens assembly includes a plastic lens barrel 111 and a plurality of plastic lens elements, wherein the plurality of plastic lens elements are disposed in the plastic lens barrel 111. From the object side to the image side are a first plastic lens element 1121, a second plastic lens element 1122, a third plastic lens element 1123, a fourth plastic lens element 1124, and a fifth plastic lens element 1125. Specifically, in the 1st embodiment, a number of the plurality of plastic lens elements is N, and N=5. Further, the imaging lens assembly further includes a plurality of light blocking sheets 1131, 1132, 1133, a plurality of spacer rings 1134, 1135 and a fixing ring 1136. The light blocking sheets 1131, 1132, 1133, the spacer rings 1134, 1135 and the fixing ring 1136 are disposed in the plastic lens barrel 111.

Figure 1E:
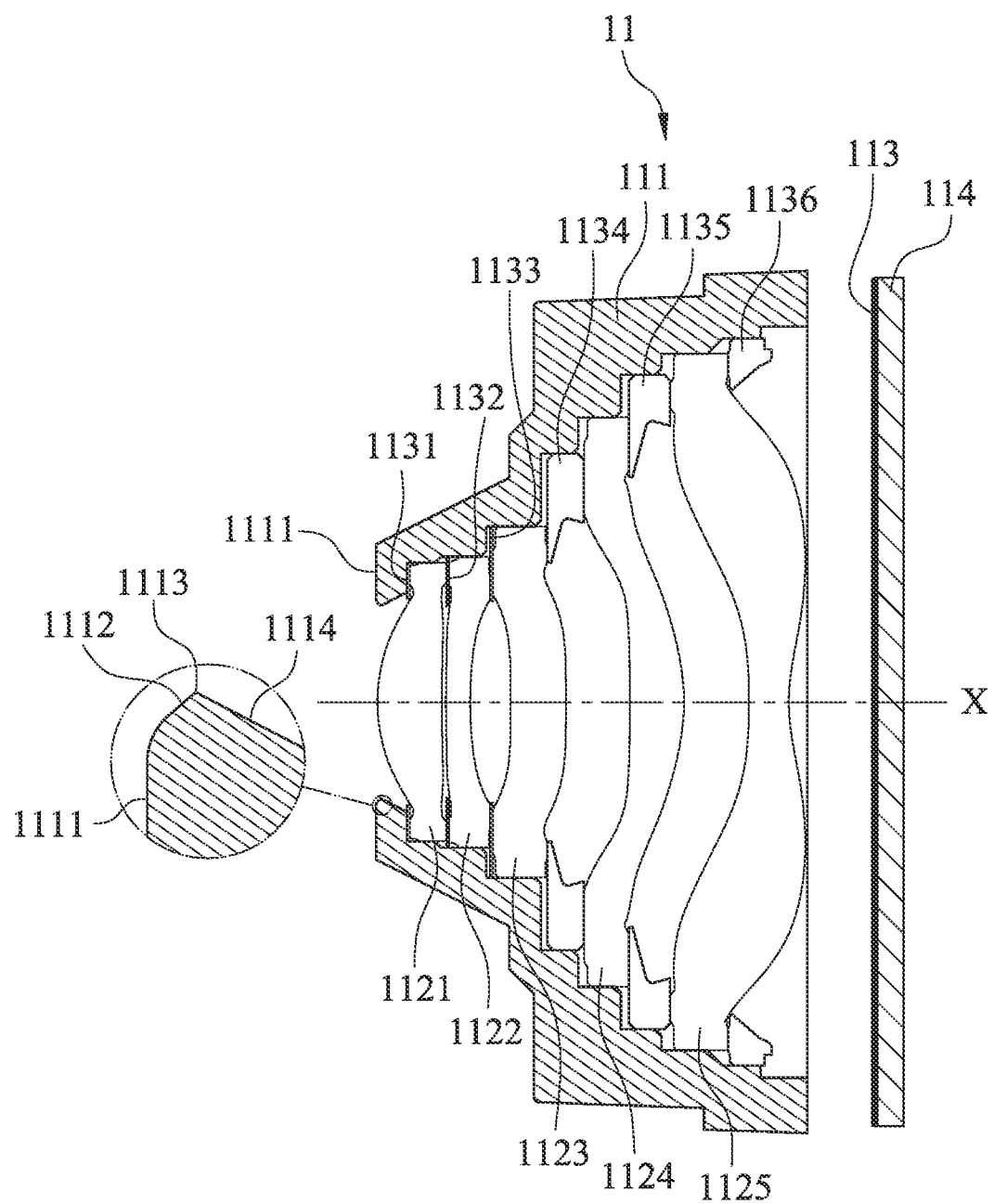
Figure 1F:
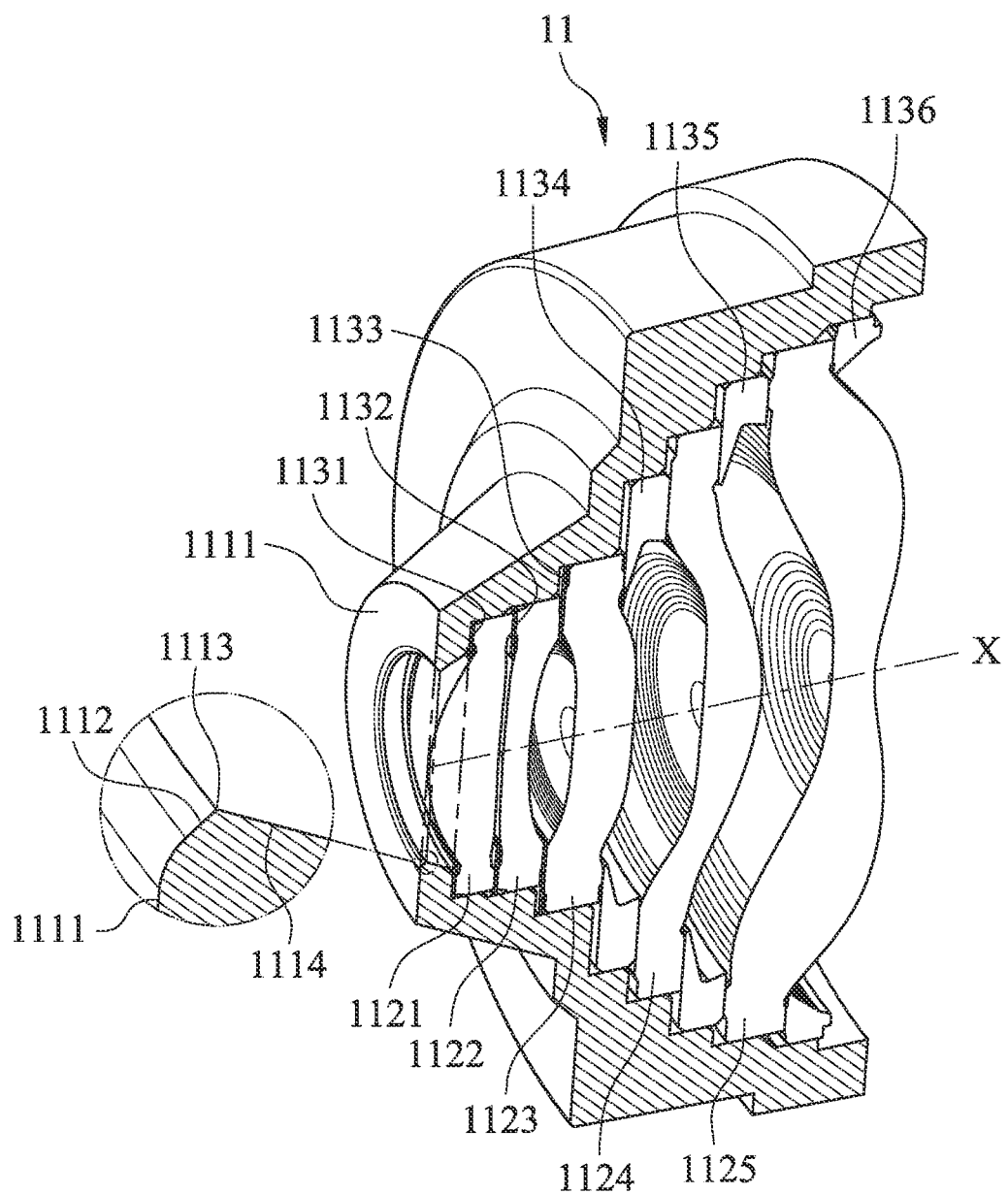

FIG. 1E is a schematic view of a plastic lens barrel 111 according to the 1st embodiment of FIG. 1A. FIG. 1F is a three-dimensional schematic view of the plastic lens barrel 111 according to the 1st embodiment of FIG. 1A. As shown in FIGS. 1E and 1F, the plastic lens barrel 111 includes an object-side outer surface 1111, an object-side outer inclined surface 1112, a lens barrel minimum opening 1113 and a reversing inclined surface 1114. The object-side outer surface 1111 is a surface of the plastic lens barrel 111 facing towards an object side and being closest to the object side and is annular. The object-side outer inclined surface 1112 is shrunk from the object-side outer surface 1111 toward the lens barrel minimum opening 1113. The reversing inclined surface 1114 is expanded from the lens barrel minimum opening 1113 to the image side, wherein a connecting position of the reversing inclined surface 1114 and the object-side outer inclined surface 1112 forms the lens barrel minimum opening 1113. Further, the light blocking sheet 1131 is located between the lens barrel minimum opening 1113 and an object-side peripheral portion of one of the plurality of plastic lens elements being closest to the object side (that is, the first plastic lens element 1121).

Figure 1G:
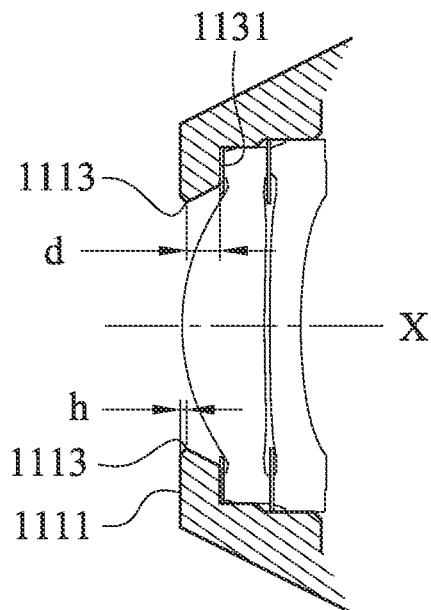

FIG. 1G is a schematic view of parameters h and d according to the 1st embodiment of FIG. 1A. As shown in FIG. 1G, a distance between the lens barrel minimum opening 1113 and the object-side outer surface 1111 in a direction parallel to the optical axis X is h, a distance between the lens barrel minimum opening 1113 and the light blocking sheet 1131 in the direction parallel to the optical axis X is d, and h=0.04 mm, h=0.2155 mm and d/h=5.3875.

Figure 1H:
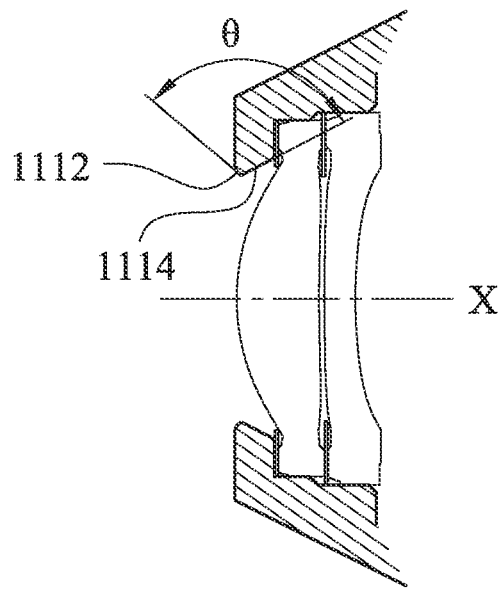

FIG. 1H is a schematic view of a parameter θ according to the 1st embodiment of FIG. 1A. As shown in FIG. 1H, the object-side outer inclined surface 1112 is a first conical surface (its reference numeral is omitted), the reversing inclined surface 1114 is a second conical surface (its reference numeral is omitted). An angle between a sectional line passing through the optical axis X of the first conical surface and a sectional line passing through the optical axis X of the second conical surface is θ, and θ=112.63 degrees.

Figure 1I:
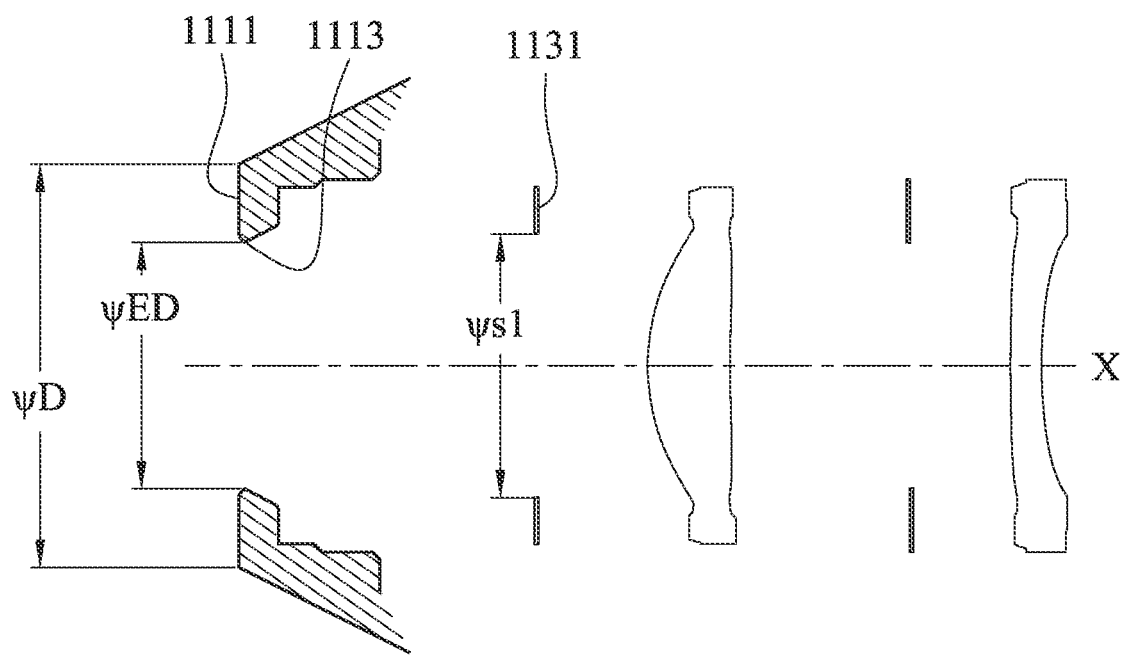

FIG. 1I is a schematic view of parameters ψD, ψED and ψs1 according to the 1st embodiment of FIG. 1A. As shown in FIG. 1I, a maximum outer diameter of the object-side outer surface 1111 is ψD, a diameter of the lens barrel minimum opening 1113 is ψED, a diameter of an opening of the light blocking sheet 1131 is ψs1, and ψD=2.6 mm, ψED=1.59 mm, ψs1=1.7 mm and ψED/ψs1=0.935.

As shown in FIGS. 1C and 1D, a distance between the object-side outer surface 1111 and the surface plate 12 in the direction parallel to the optical axis X is g, and g=0.13 mm. It should be mentioned that, the backlight board 122 of the surface plate 12 has an opening 1221 corresponding to the imaging lens assembly, the area of the surface glass 121 corresponding to the opening 1221 is an imaging window which is coaxial with the imaging lens assembly so as to facilitate the imaging lens assembly to capture the image, and the distance between the object-side outer surface 1111 and the surface plate 12 in the direction parallel to the optical axis X is the distance between the object-side outer surface 1111 and the image-side surface of the surface glass 121 in the direction parallel to the optical axis X. Further, a chief ray angle between a chief ray corresponding to 1.0F image height of the imaging lens assembly and the image sensor 114 is CRA 1.0F, and CRA 1.0F=33.73 degrees.

2nd Embodiment

Figure 2A:
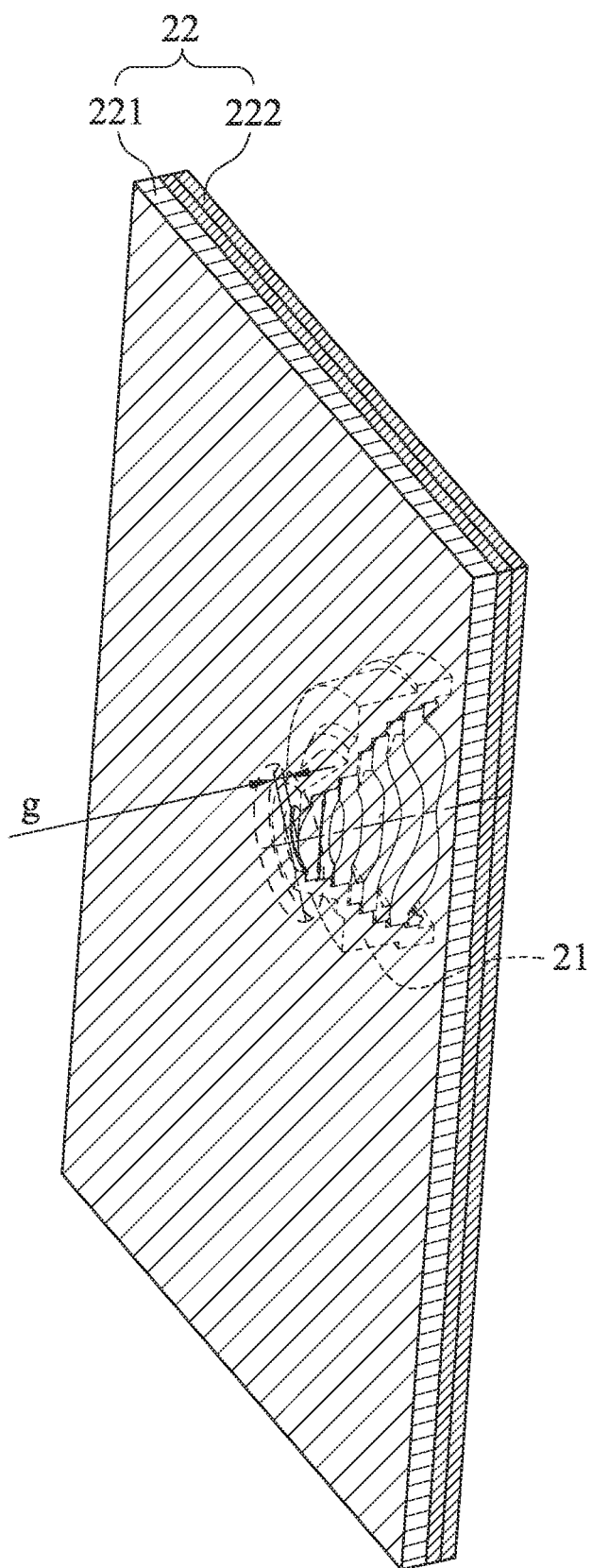
FIG. 2A is a schematic view of a surface plate and a camera module of an electronic device according to the 2nd embodiment of the present disclosure.

FIG. 2A is a schematic view of a surface plate 22 and a camera module 21 of an electronic device according to the 2nd embodiment of the present disclosure. In FIG. 2A, the electronic device (its reference numeral is omitted) includes a camera module 21 and a surface plate 22. The surface plate 22 is disposed on the object side of the camera module 21.

Figure 2B:
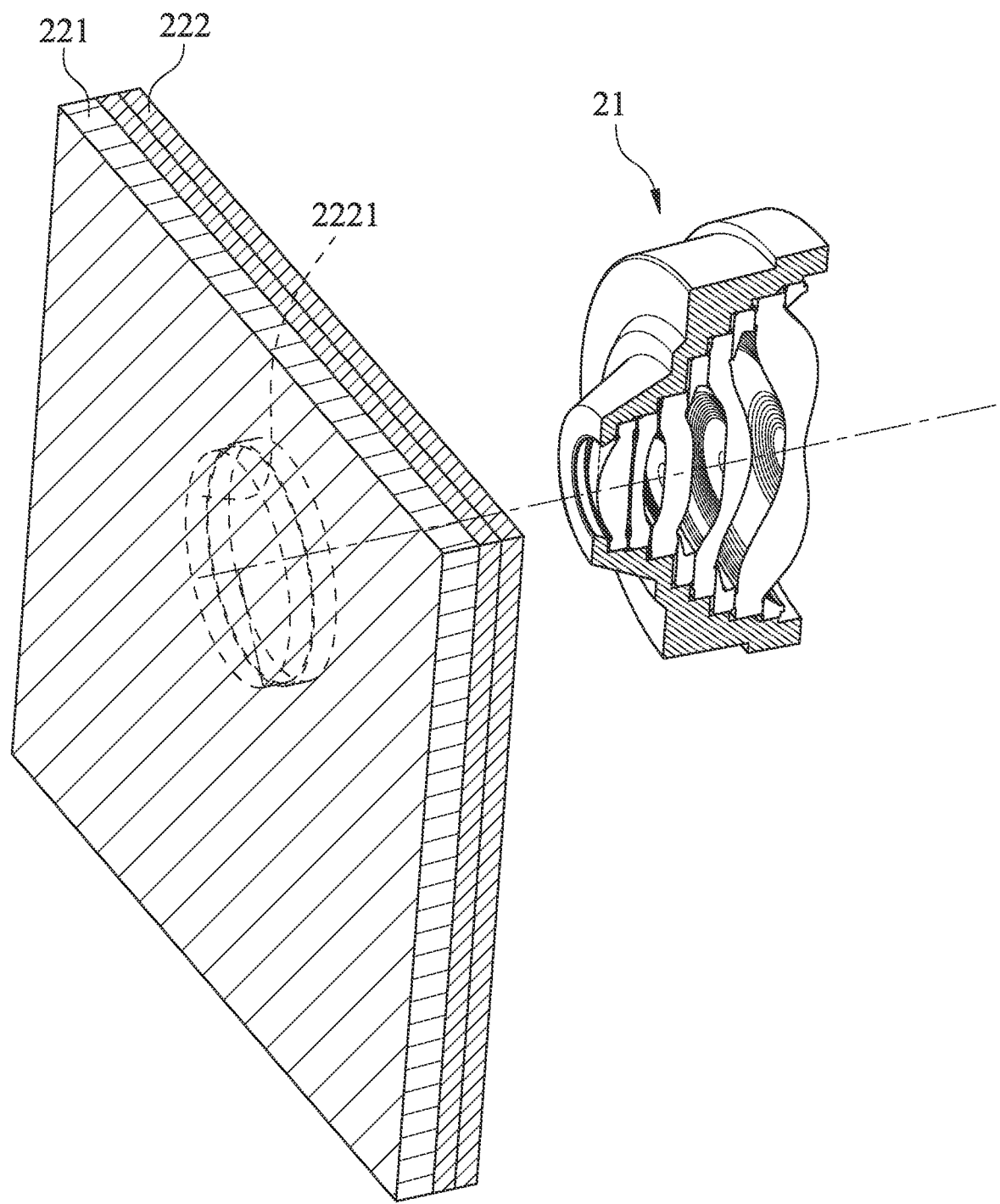
FIG. 2B is another schematic view of the surface plate and the camera module according to the 2nd embodiment of FIG. 2A.
Figure 2C:
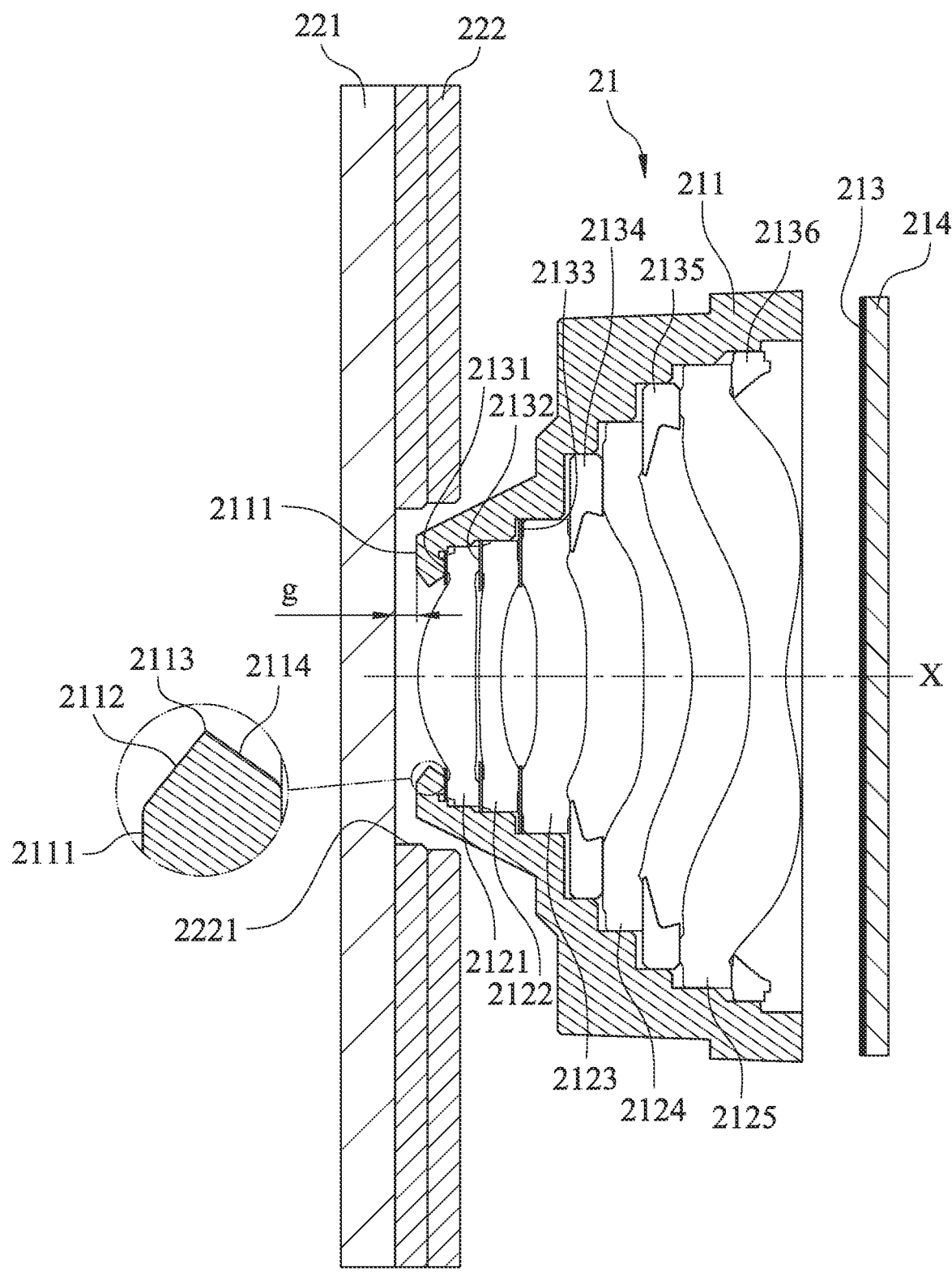
FIG. 2C is another schematic view of the surface plate and the camera module according to the 2nd embodiment of FIG. 2A.

FIG. 2B is another schematic view of the surface plate 22 and the camera module 21 according to the 2nd embodiment of FIG. 2A. FIG. 2C is another schematic view of the surface plate 12 and the camera module 21 according to the 2nd embodiment of FIG. 2A. In FIGS. 2B and 2C, the surface plate 22 can be a plate having a display function module and includes a surface glass 221 and a backlight board 222. The backlight board 222 can further include a circuit board or auxiliary components related to the backlight board 222. The backlight board 222 is connected to the image-side surface of the surface glass 221, wherein the surface glass 221 can be a glass substrate, and the backlight board 222 can be an LED used as a light source of array light, but the present disclosure will not be limited thereto. The camera module 21 includes an imaging lens assembly (its reference numeral is omitted) and an image sensor 214. The image sensor 214 is located at an image side of the imaging lens assembly (that is, on the imaging surface 213). The surface plate 22 is located at the object side of the imaging lens assembly.

The imaging lens assembly includes a plastic lens barrel 211 and a plurality of plastic lens elements, wherein the plurality of plastic lens elements are disposed in the plastic lens barrel 211. From the object side to the image side are a first plastic lens element 2121, a second plastic lens element 2122, a third plastic lens element 2123, a fourth plastic lens element 2124, and a fifth plastic lens element 2125. Specifically, in the 2nd embodiment, a number of the plurality of plastic lens elements is N, and N=5. Further, the imaging lens assembly further includes a plurality of light blocking sheets 2131, 2132, 2133, a plurality of spacer rings 2134, 2135 and a fixing ring 2136. The light blocking sheets 2131, 2132, 2133, the spacer rings 2134, 2135 and the fixing ring 2136 are disposed in the plastic lens barrel 211.

The plastic lens barrel 211 includes an object-side outer surface 2111, an object-side outer inclined surface 2112, a lens barrel minimum opening 2113 and a reversing inclined surface 2114. The object-side outer surface 2111 is a surface of the plastic lens barrel 211 facing towards an object side and being closest to the object side and is annular. The object-side outer inclined surface 2112 is shrunk from the object-side outer surface 2111 toward the lens barrel minimum opening 2113. The reversing inclined surface 2114 is expanded from the lens barrel minimum opening 2113 to the image side, wherein a connecting position of the reversing inclined surface 2114 and the object-side outer inclined surface 2112 forms the lens barrel minimum opening 2113. Further, the light blocking sheet 2131 is located between the lens barrel minimum opening 2113 and an object-side peripheral portion of one of the plurality of plastic lens elements being closest to the object side (that is, the first plastic lens element 2121).

FIG. 2D is a schematic view of parameters h and d according to the 2nd embodiment of FIG. 2A. As shown in FIG. 2D, a distance between the lens barrel minimum opening 2113 and the object-side outer surface 2111 in a direction parallel to the optical axis X is h, a distance between the lens barrel minimum opening 2113 and the light blocking sheet 2131 in the direction parallel to the optical axis X is d. In FIG. 2D, h=0.1155 mm, h=0.14 mm and d/h=1.2121.

FIG. 2E is a schematic view of a parameter θ according to the 2nd embodiment of FIG. 2A. As shown in FIG. 2E, the object-side outer inclined surface 2112 is a first conical surface (its reference numeral is omitted), the reversing inclined surface 2114 is a second conical surface (its reference numeral is omitted). An angle between a sectional line passing through the optical axis X of the first conical surface and a sectional line passing through the optical axis X of the second conical surface is θ, and θ=93.95 degrees.

FIG. 2F is a schematic view of parameters ψD, ψED and ψs1 according to the 2nd embodiment of FIG. 2A. As shown in FIG. 2F, a maximum outer diameter of the object-side outer surface 2111 is ψD, a diameter of the lens barrel minimum opening 2113 is ψED, a diameter of an opening of the light blocking sheet 2131 is ψs1. In FIG. 2F, ψD=2.6 mm, ψED=1.66 mm, ψs1=1.7 mm and ψED/ψs1=0.976.

As shown in FIGS. 2A and 2C, a distance between the object-side outer surface 2111 and the surface plate 22 in the direction parallel to the optical axis X is g, and g=0.2 mm. It should be mentioned that, the backlight board 222 of the surface plate 22 has an opening 2221 corresponding to the imaging lens assembly, the area of the surface glass 221 corresponding to the opening 2221 is an imaging window which is coaxial with the imaging lens assembly so as to facilitate the imaging lens assembly to capture the image, and the distance between the object-side outer surface 2111 and the surface plate 22 in the direction parallel to the optical axis X is the distance between the object-side outer surface 2111 and the image-side surface of the surface glass 221 in the direction parallel to the optical axis X. Further, a chief ray angle between a chief ray corresponding to 1.0F image height of the imaging lens assembly and the image sensor 214 is CRA 1.0F, and CRA 1.0F=33.73 degrees.

3rd Embodiment

Figure 3A:
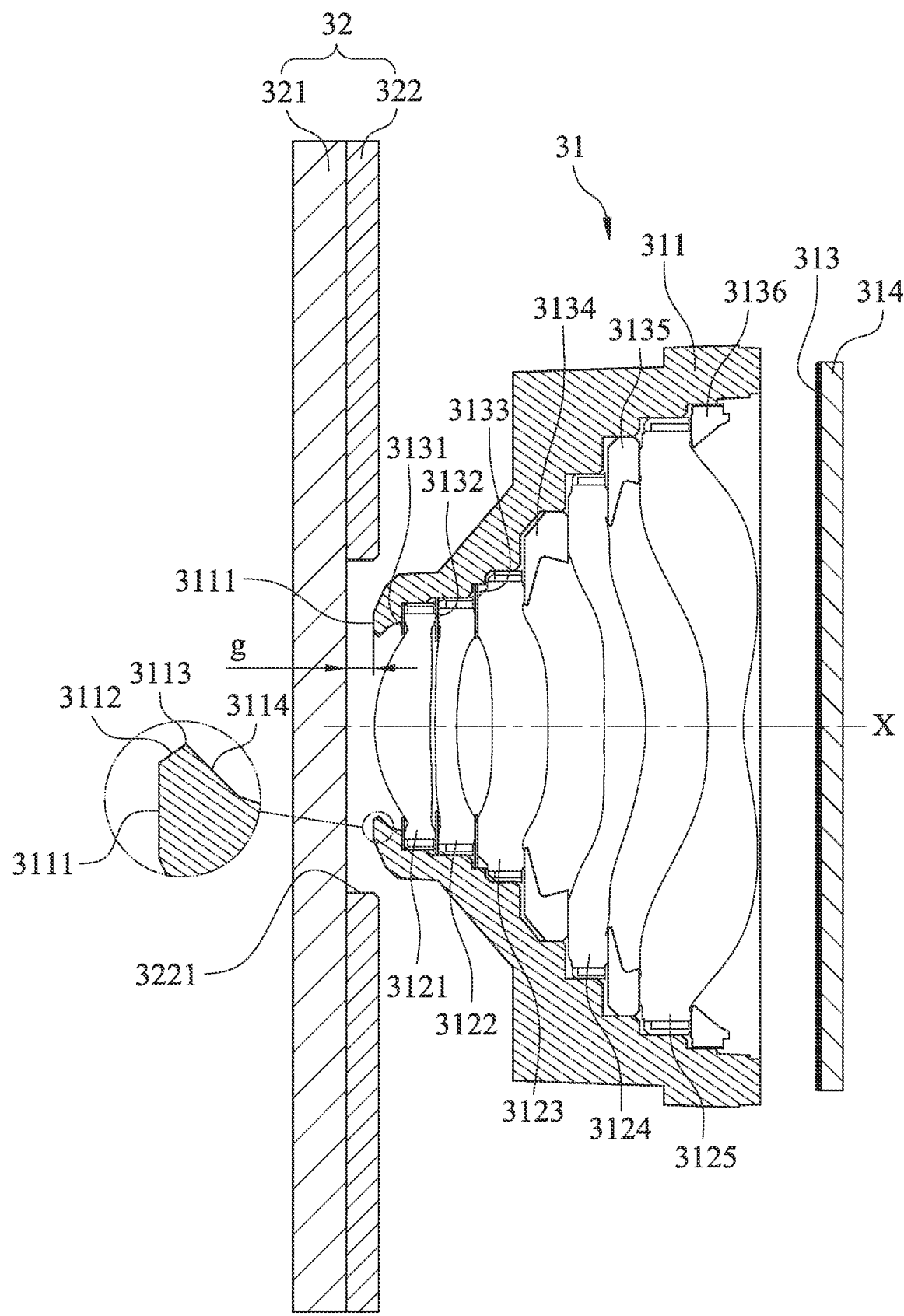
FIG. 3A is a schematic view of a surface plate and a camera module of an electronic device according to the 3rd embodiment of the present disclosure.

FIG. 3A is a schematic view of a surface plate 32 and a camera module 31 of an electronic device according to the 3rd embodiment of the present disclosure. In FIG. 3A, the electronic device (its reference numeral is omitted) includes a camera module 31 and a surface plate 32. The surface plate 32 is disposed on the object side of the camera module 31. The surface plate 32 can be a plate having a display function module and includes a surface glass 321 and a backlight board 322, wherein the backlight board 322 is connected to the image-side surface of the surface glass 321, the surface glass 321 can be a glass substrate, and the backlight board 322 can be an LED and used as a light source of array light, but the present disclosure will not be limited thereto. The camera module 31 includes an imaging lens assembly (its reference numeral is omitted) and an image sensor 314. The image sensor 314 is located at an image side of the imaging lens assembly (that is, on the imaging surface 313). The surface plate 32 is located at the object side of the imaging lens assembly.

The imaging lens assembly includes a plastic lens barrel 311 and a plurality of plastic lens elements, wherein the plurality of plastic lens elements are disposed in the plastic lens barrel 311. From the object side to the image side are a first plastic lens element 3121, a second plastic lens element 3122, a third plastic lens element 3123, a fourth plastic lens element 3124, and a fifth plastic lens element 3125. Specifically, in the 3rd embodiment, a number of the plurality of plastic lens elements is N, and N=5. Further, the imaging lens assembly further includes a plurality of light blocking sheets 3131, 3132, 3133, a plurality of spacer rings 3134, 3135 and a fixing ring 3136. The light blocking sheets 3131, 3132, 3133, the spacer rings 3134, 3135 and the fixing ring 3136 are disposed in the plastic lens barrel 311.

The plastic lens barrel 311 includes an object-side outer surface 3111, an object-side outer inclined surface 3112, a lens barrel minimum opening 3113 and a reversing inclined surface 3114. The object-side outer surface 3111 is a surface of the plastic lens barrel 311 facing towards an object side and being closest to the object side and is annular. The object-side outer inclined surface 3112 is shrunk from the object-side outer surface 3111 toward the lens barrel minimum opening 3113. The reversing inclined surface 3114 is expanded from the lens barrel minimum opening 3113 to the image side, wherein a connecting position of the reversing inclined surface 3114 and the object-side outer inclined surface 3112 forms the lens barrel minimum opening 3113. Further, the light blocking sheet 3131 is located between the lens barrel minimum opening 3113 and an object-side peripheral portion of one of the plurality of plastic lens elements being closest to the object side (that is, the first plastic lens element 3121).

Figure 3B:
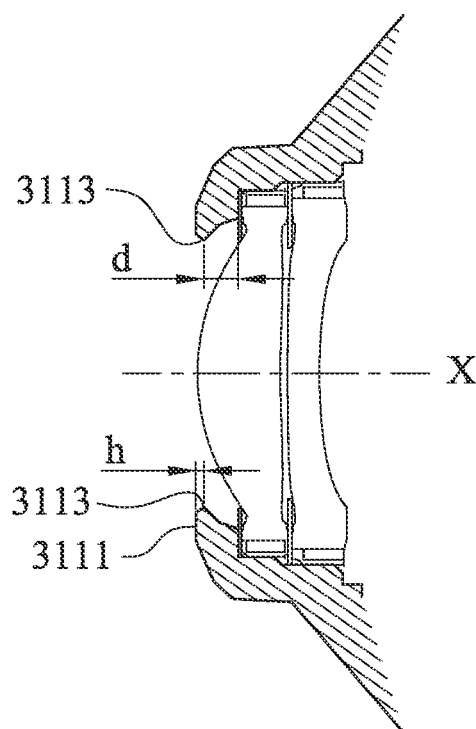
FIG. 3B is a schematic view of parameters h and d according to the 3rd embodiment of FIG. 3A.

FIG. 3B is a schematic view of parameters h and d according to the 3rd embodiment of FIG. 3A. As shown in FIG. 3B, a distance between the lens barrel minimum opening 3113 and the object-side outer surface 3111 in a direction parallel to the optical axis X is h, a distance between the lens barrel minimum opening 3113 and the light blocking sheet 3131 in the direction parallel to the optical axis X is d, and h=0.05 mm, h=0.215 mm and d/h=4.3.

Figure 3C:
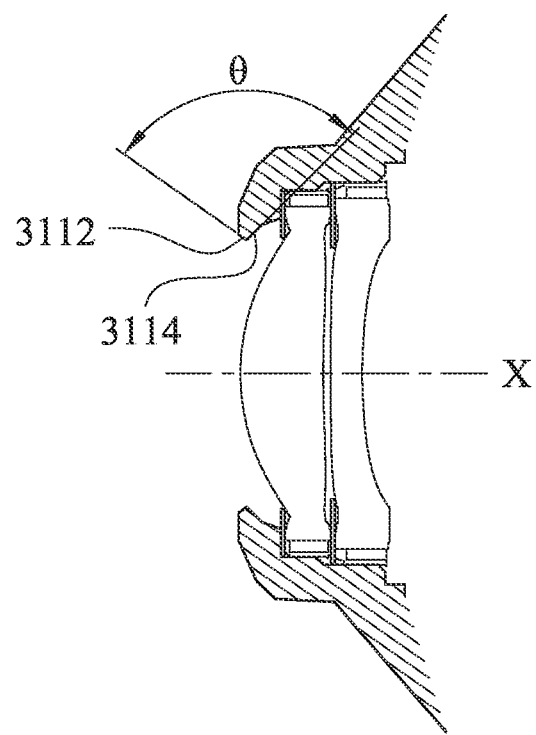
FIG. 3C is a schematic view of a parameter θ according to the 3rd embodiment of FIG. 3A.

FIG. 3C is a schematic view of a parameter θ according to the 3rd embodiment of FIG. 3A. As shown in FIG. 3C, the object-side outer inclined surface 3112 is a first conical surface (its reference numeral is omitted), the reversing inclined surface 3114 is a second conical surface (its reference numeral is omitted). An angle between a sectional line passing through the optical axis X of the first conical surface and a sectional line passing through the optical axis X of the second conical surface is θ, and θ=100 degrees.

Figure 3D:
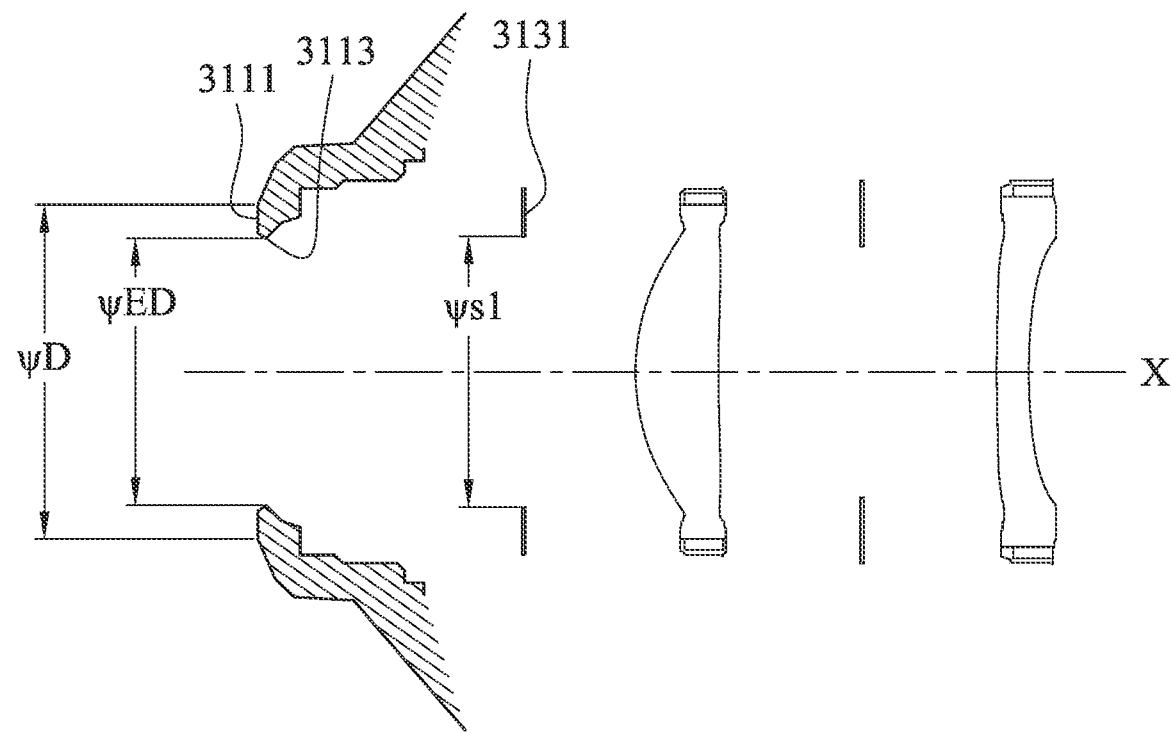
FIG. 3D is a schematic view of parameters ψD, ψED and ψs1 according to the 3rd embodiment of FIG. 3A.

FIG. 3D is a schematic view of parameters ψD, ψED and ψs1 according to the 3rd embodiment of FIG. 3A. As shown in FIG. 3D, a maximum outer diameter of the object-side outer surface 3111 is ψD, a diameter of the lens barrel minimum opening 3131 is ψED, a diameter of an opening of the light blocking sheet 3113 is ψs1, and ψD=2.1 mm, ψED=1.68 mm, ψs1=1.7 mm and ψED/s1=0.988.

As shown in FIG. 3A, a distance between the object-side outer surface 3111 and the surface plate 32 in the direction parallel to the optical axis X is g, and g=0.25 mm. It should be mentioned that, the backlight board 322 of the surface plate 32 has an opening 3221 corresponding to the imaging lens assembly, the area of the surface glass 321 corresponding to the opening 3221 is an imaging window which is coaxial with the imaging lens assembly so as to facilitate the imaging lens assembly to capture the image, and the distance between the object-side outer surface 3111 and the surface plate 32 in the direction parallel to the optical axis X is the distance between the object-side outer surface 3111 and the image-side surface of the surface glass 321 in the direction parallel to the optical axis X. Further, an angle between a chief ray correspondent to 1.0F of the imaging lens assembly and a chief ray correspondent to 1.0F of the image sensor 314 is CRA 1.0F, and CRA 1.0F=33.73 degrees.

4th Embodiment

Figure 4A:
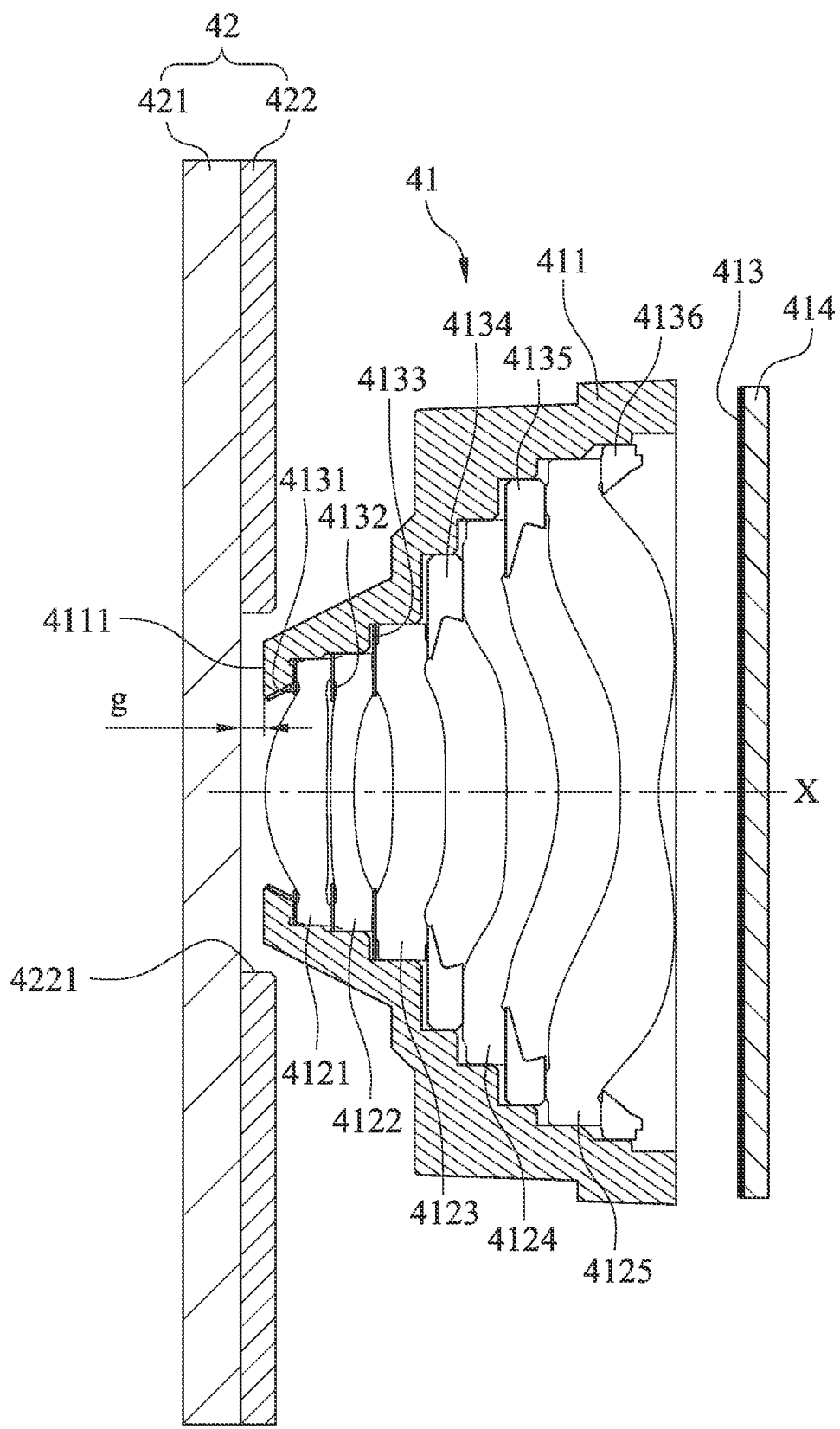
FIG. 4A is a schematic view of a surface plate and a camera module of an electronic device according to the 4th embodiment of the present disclosure.

FIG. 4A is a schematic view of a surface plate 42 and a camera module 41 of an electronic device according to the 4th embodiment of the present disclosure. In FIG. 4A, the electronic device (its reference numeral is omitted) includes a camera module 41 and a surface plate 42. The surface plate 42 is disposed on the object side of the camera module 41. The surface plate 42 can be a plate having a display function module and includes a surface glass 421 and a backlight board 422. The backlight board 422 is connected to the image-side surface of the surface glass 421, wherein the surface glass 421 can be a glass substrate, and the backlight board 422 can be an LED used as a light source of array light, but the present disclosure will not be limited thereto. The camera module 41 includes an imaging lens assembly (its reference numeral is omitted) and an image sensor 414. The image sensor 414 is located at an image side of the imaging lens assembly (that is, on the imaging surface 413). The surface plate 42 is located at the object side of the imaging lens assembly.

Figure 4B:
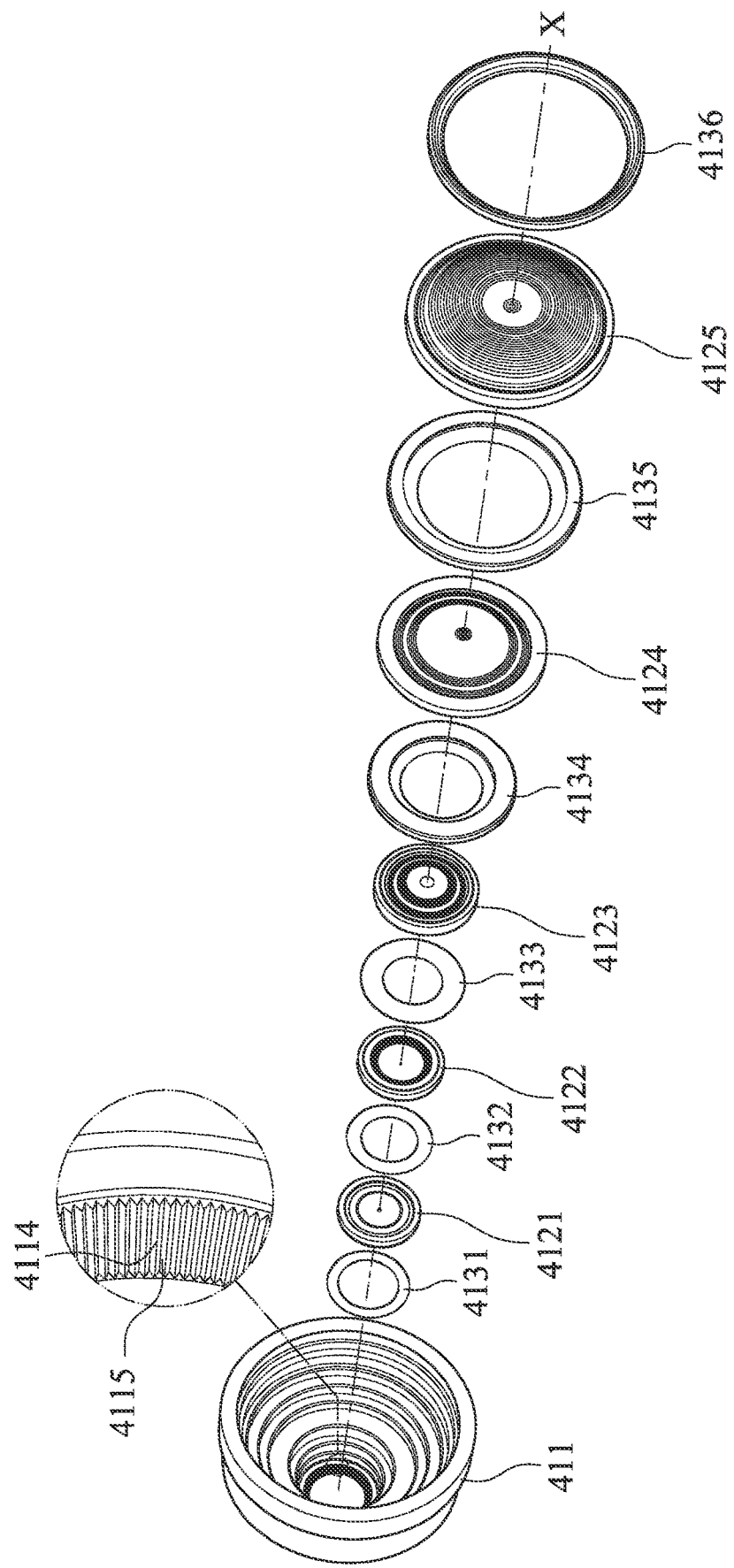
FIG. 4B is an exploded view of an imaging lens assembly according to the 4th embodiment of FIG. 4A.

FIG. 4B is an exploded view of an imaging lens assembly according to the 4th embodiment of FIG. 4A. As shown in FIGS. 4A and 4B, the imaging lens assembly includes a plastic lens barrel 411 and a plurality of plastic lens elements, wherein the plurality of plastic lens elements are disposed in the plastic lens barrel 411. From the object side to the image side are a first plastic lens element 4121, a second plastic lens element 4122, a third plastic lens element 4123, a fourth plastic lens element 4124, and a fifth plastic lens element 4125. Specifically, in the 4th embodiment, a number of the plurality of plastic lens elements is N, and N=5. Further, the imaging lens assembly further includes a plurality of light blocking sheets 4131, 4132, 4133, a plurality of spacer rings 4134, 4135 and a fixing ring 4136. The light blocking sheets 4131, 4132, 4133, the spacer rings 4134, 4135 and the fixing ring 4136 are disposed in the plastic lens barrel 411.

Figure 4C:
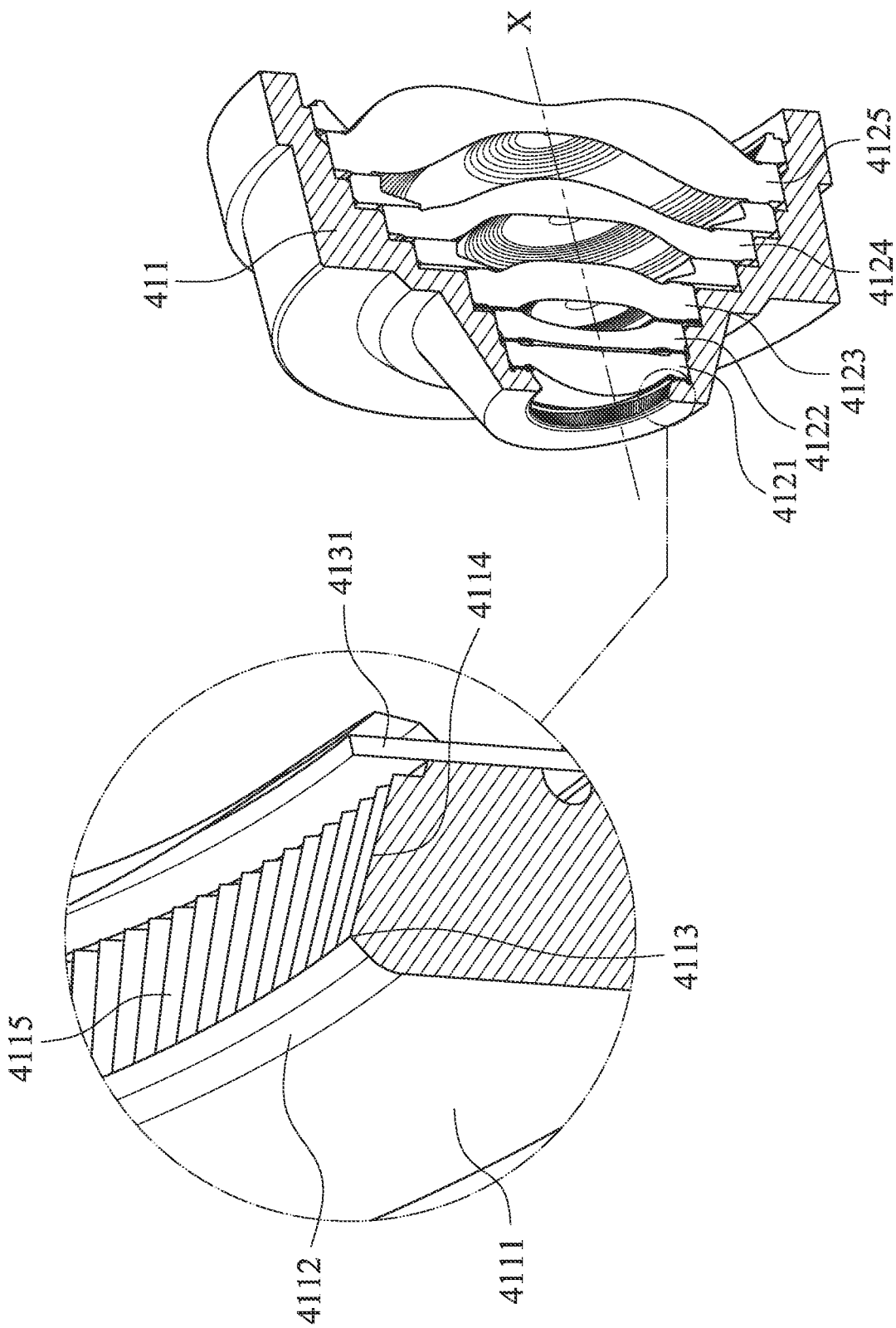
FIG. 4C is a three-dimensional schematic view of a plastic lens barrel according to the 4th embodiment of FIG. 4A.

FIG. 4C is a three-dimensional schematic view of a plastic lens barrel 411 according to the 4th embodiment of FIG. 4A. In FIG. 4C, the plastic lens barrel 411 includes an object-side outer surface 4111, an object-side outer inclined surface 4112, a lens barrel minimum opening 4113 and a reversing inclined surface 4114. The object-side outer surface 4111 is a surface of the plastic lens barrel 411 facing towards an object side and being closest to the object side and is annular. The object-side outer inclined surface 4112 is shrunk from the object-side outer surface 4111 toward the lens barrel minimum opening 4113. The reversing inclined surface 4114 is expanded from the lens barrel minimum opening 4113 to the image side, wherein a connecting position of the reversing inclined surface 4114 and the object-side outer inclined surface 4112 forms the lens barrel minimum opening 4113. Further, the light blocking sheet 4131 is located between the lens barrel minimum opening 4113 and an object-side peripheral portion of one of the plurality of plastic lens elements being closest to the object side (that is, the first plastic lens element 4121).

Further, the reversing inclined surface 4114 includes a plurality of strip-shaped structures 4115 extended from the lens barrel minimum opening 4113 toward a direction perpendicular to the optical axis X. In detail, in the 4th embodiment, the strip-shaped structures 4115 are the wedge structure, and the number of the strip-shaped structures 4115 is 320. The strip-shaped structures 4115 are linearly tapered from the reversing inclined surface 4114 toward the optical axis X.

Figure 4D:
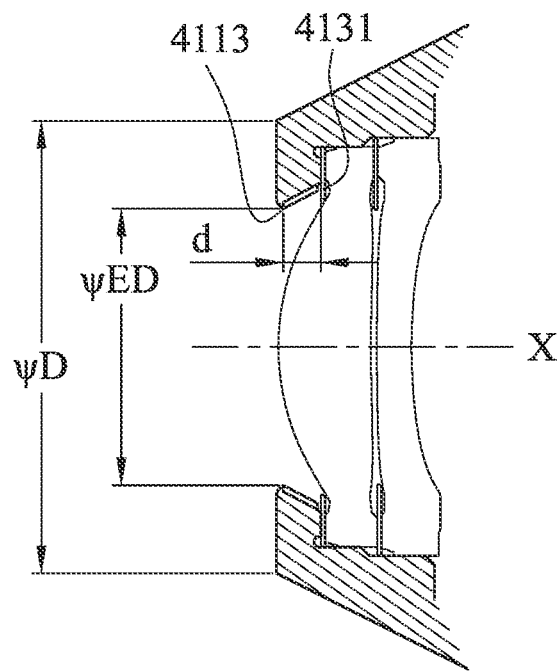
FIG. 4D is a schematic view of parameters ψD, ψED and d according to the 4th embodiment of FIG. 4A.
Figure 4E:
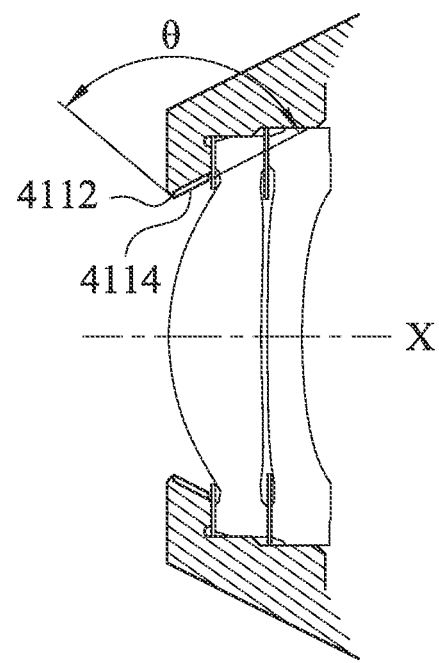
FIG. 4E is a schematic view of a parameter θ according to the 4th embodiment of FIG. 4A.
Figure 4F:
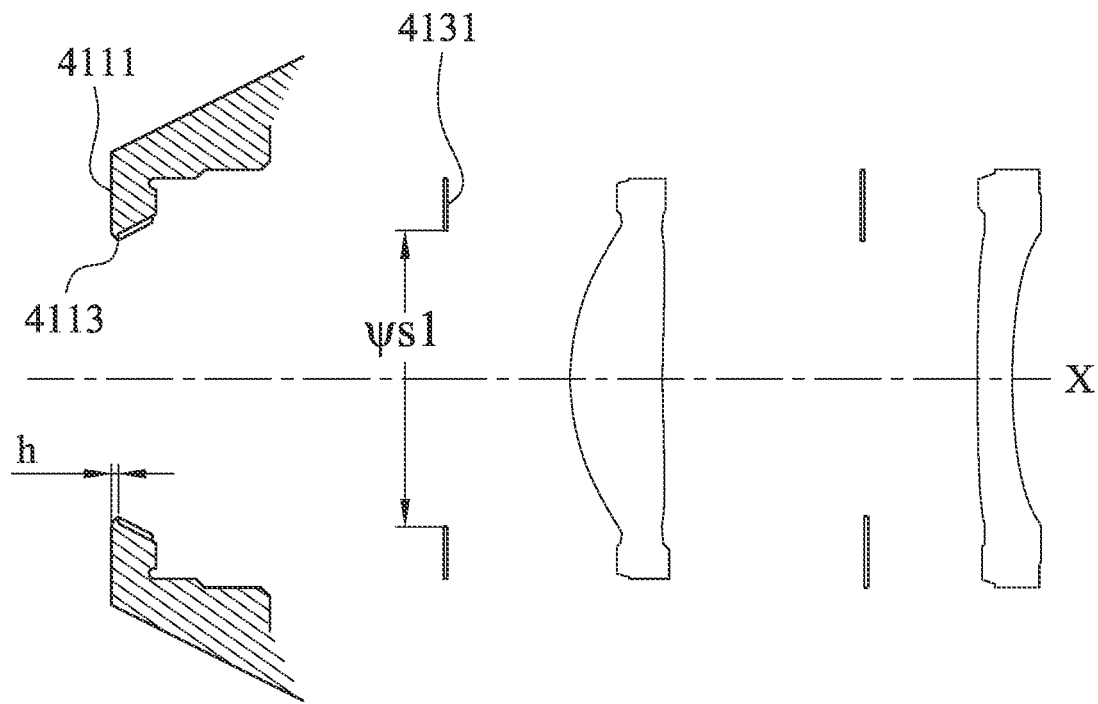
FIG. 4F is a schematic view of parameters h and ψs1 according to the 4th embodiment of FIG. 4A.

FIG. 4D is a schematic view of parameters ψD, ψED and d according to the 4th embodiment of FIG. 4A. FIG. 4E is a schematic view of a parameter θ according to the 4th embodiment of FIG. 4A. FIG. 4F is a schematic view of parameters h and ψs1 according to the 4th embodiment of FIG. 4A. As shown in FIGS. 4D, 4E and 4F, a distance between the lens barrel minimum opening 4113 and the object-side outer surface 4111 in a direction parallel to the optical axis X is h, a distance between the lens barrel minimum opening 4113 and the light blocking sheet 4131 in the direction parallel to the optical axis X is d, and h=0.04 mm, h=0.2155 mm and d/h=5.3875. The object-side outer inclined surface 4112 is a first conical surface (its reference numeral is omitted), the reversing inclined surface 4114 is a second conical surface (its reference numeral is omitted). An angle between a sectional line passing through the optical axis X of the first conical surface and a sectional line passing through the optical axis X of the second conical surface is θ, and 74 =112.63 degrees. A maximum outer diameter of the object-side outer surface 4111 is ψD, a diameter of the lens barrel minimum opening 4113 is ψED, a diameter of an opening of the light blocking sheet 4131 is ψs1, and ψD=2.6 mm, ψED=1.59 mm, ψs1=1.7 mm and ψED/ψs1=0.935.

As shown in FIG. 4A, a distance between the object-side outer surface 4111 and the surface plate 42 in the direction parallel to the optical axis X is g, and g=0.2 mm. It should be mentioned that, the backlight board 422 of the surface plate 42 corresponding to the imaging lens assembly has an opening 4221 corresponding to the imaging lens assembly, the area of the surface glass 421 corresponding to the opening 4221 is an imaging window which is coaxial with the imaging lens assembly so as to facilitate the imaging lens assembly to capture the image, and the distance between the object-side outer surface 4111 and the surface plate 42 in the direction parallel to the optical axis X is the distance between the object-side outer surface 4111 and the image-side surface of the surface glass 421 in the direction parallel to the optical axis X. Further, a chief ray angle between a chief ray corresponding to 1.0F image height of the imaging lens assembly and the image sensor 414 is CRA 1.0F, and CRA 1.0F=33.73 degrees.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising an imaging lens assembly and an image sensor, wherein the image sensor is located at an image side of the imaging lens assembly, and the imaging lens assembly has an optical axis and comprises:
   a plastic lens barrel comprising:
      an object-side outer surface being a surface of the plastic lens barrel facing towards an object side and closest to the object side and being annular;
      a lens barrel minimum opening surrounded by the object-side outer surface; and
      a reversing inclined surface expanded from the lens barrel minimum opening to the image side;
   a plurality of plastic lens elements disposed in the plastic lens barrel; and a light blocking sheet disposed in the plastic lens barrel and located between the lens barrel minimum opening and an object-side peripheral portion of one of the plastic lens elements being closest to the object side;

wherein a number of the plurality of plastic lens elements is N, a distance between the lens barrel minimum opening and the light blocking sheet in the direction parallel to the optical axis is d, a distance between the lens barrel minimum opening and the object-side outer surface in a direction parallel to the optical axis is h, a chief ray angle between a chief ray corresponding to 1.0F image height of the imaging lens assembly and the image sensor is CRA 1.0F, and the following conditions are satisfied:

$4 \leq N \leq 10;$ $0.10 \text{ mm} < d < 0.4 \text{ mm};$ $0.01 \text{ mm} < h < 0.15 \text{ mm},$ $1.0 < d/h < 15.0;$ and CRA $1.0F > 25.0$ degrees.

2. The camera module of claim 1, wherein the reversing inclined surface comprises a plurality of strip-shaped structures extended from the lens barrel minimum opening toward a direction perpendicular to the optical axis.

3. The camera module of claim 1, wherein a diameter of the lens barrel minimum opening is $\psi ED$, a diameter of an opening of the light blocking sheet is $\psi s1$, and the following condition is satisfied:

$0.8 \leq \psi ED/\psi s1 \leq 1.05.$

4. The camera module of claim 3, wherein the diameter of the lens barrel minimum opening is $\psi ED$, the diameter of the opening of the light blocking sheet is $\psi s1$, and the following condition is satisfied:

$0.8 \leq \psi ED/\psi s1 \leq 1.0.$

5. The camera module of claim 1, wherein the plastic lens barrel further comprises:
an object-side outer inclined surface shrunk from the object-side outer surface toward the lens barrel minimum opening, wherein a connecting position of the reversing inclined surface and the object-side outer inclined surface forms the lens barrel minimum opening.

6. An electronic device, comprising:
the camera module of claim 1; and
a surface plate disposed on the object side of the camera module, wherein the surface plate is a plate having a display function module.

7. The electronic device of claim 6, wherein the plastic lens barrel further comprises:
an object-side outer inclined surface shrunk from the object-side outer surface toward the lens barrel minimum opening, wherein a connecting position of the reversing inclined surface and the object-side outer inclined surface forms the lens barrel minimum opening.

8. The electronic device of claim 6, wherein a distance between the object-side outer surface and the surface plate in the direction parallel to the optical axis is g, and the following condition is satisfied:

$0.03 \text{ mm} < g < 0.3 \text{ mm}.$

9. The electronic device of claim 8, wherein the distance between the object-side outer surface and the surface plate in the direction parallel to the optical axis is g, and the following condition is satisfied:

$0.03 \text{ mm} < g < 0.26 \text{ mm}.$

* * * * *